United States Patent [19]

Peoples et al.

[11] Patent Number: 4,844,380
[45] Date of Patent: Jul. 4, 1989

[54] DETACHABLE THRUST VECTOR MECHANISM FOR AN AERONAUTICAL VEHICLE

[75] Inventors: John R. Peoples, Moorpark; Billy R. Phillips, Canoga Park, both of Calif.

[73] Assignee: Hughes Aircraft Company, Los Angeles, Calif.

[21] Appl. No.: 5,714

[22] Filed: Jan. 21, 1987

Related U.S. Application Data

[63] Continuation-in-part of Ser. No. 801,445, Nov. 25, 1985, abandoned.

[51] Int. Cl.[4] .................... F42B 15/027; F42B 15/033
[52] U.S. Cl. ................................ 244/3.22; 244/3.24; 244/58; 244/63
[58] Field of Search ................. 244/3.21, 3.22, 3.24, 244/3.3, 3.1, 52, 58, 63; 89/1.8

[56] References Cited

U.S. PATENT DOCUMENTS

| | | | |
|---|---|---|---|
| 2,814,453 | 11/1957 | Trimble, Jr. et al. | 244/63 |
| 2,995,319 | 8/1961 | Kerschner et al. | 244/3.22 |
| 3,114,520 | 12/1963 | Finvold | 244/63 |
| 3,276,376 | 10/1966 | Cubbison et al. | 244/3.22 |
| 4,044,970 | 8/1977 | Maudal | 244/3.22 |
| 4,163,534 | 8/1979 | Seeger | 244/3.22 |
| 4,410,151 | 10/1983 | Höppner et al. | 244/63 |
| 4,666,105 | 5/1987 | Dellinger et al. | 244/63 |
| 4,721,271 | 1/1988 | Goldstein et al. | 244/63 |

Primary Examiner—Charles T. Jordan
Assistant Examiner—Michael J. Carone
Attorney, Agent, or Firm—M. W. Sales; V. G. Laslo; A. W. Karambelas

[57] ABSTRACT

A relatively inexpensive, high efficiency, detachable thrust vector mechanism is provided for addressing the current shortcomings in the art. In the illustrative embodiment, the invention is used in conjunction with a nautical or aeronautical vehicle having primary propulsion means and at least one fin movable, to provide maneuverability, in response to a conventional control system. The invention is a detachable thrust vector mechanism comprising auxiliary propulsion means pivotally attached to the missile through connecting means. Contact means are provided for transferring bi-directional motion of the fin to the auxiliary propulsion means. The mechanism is operable to provide auxiliary thrust for the missile along a thrust vector determined by the control system. The invention is effective to provide missile steerage at low speeds, particularly during initial launch and pitchover. The mechanism of the present invention falls away during flight to fully exploit the original optimized aerodynamic or hydrodynamic design of the missile.

The thrust vector mechanism of the present invention conserves the main motor fuel, reduces the initial missile launch signature and effectively increases its range. The invention also provides a low cost, disposable mechanism for converting a missile designed for high speed (air-to-air) launches to one adapted for low speed (surface) launches. That is, under the teachings of the present invention, existing missiles may be inexpensively retrofit to provide thrust vector control.

2 Claims, 2 Drawing Sheets

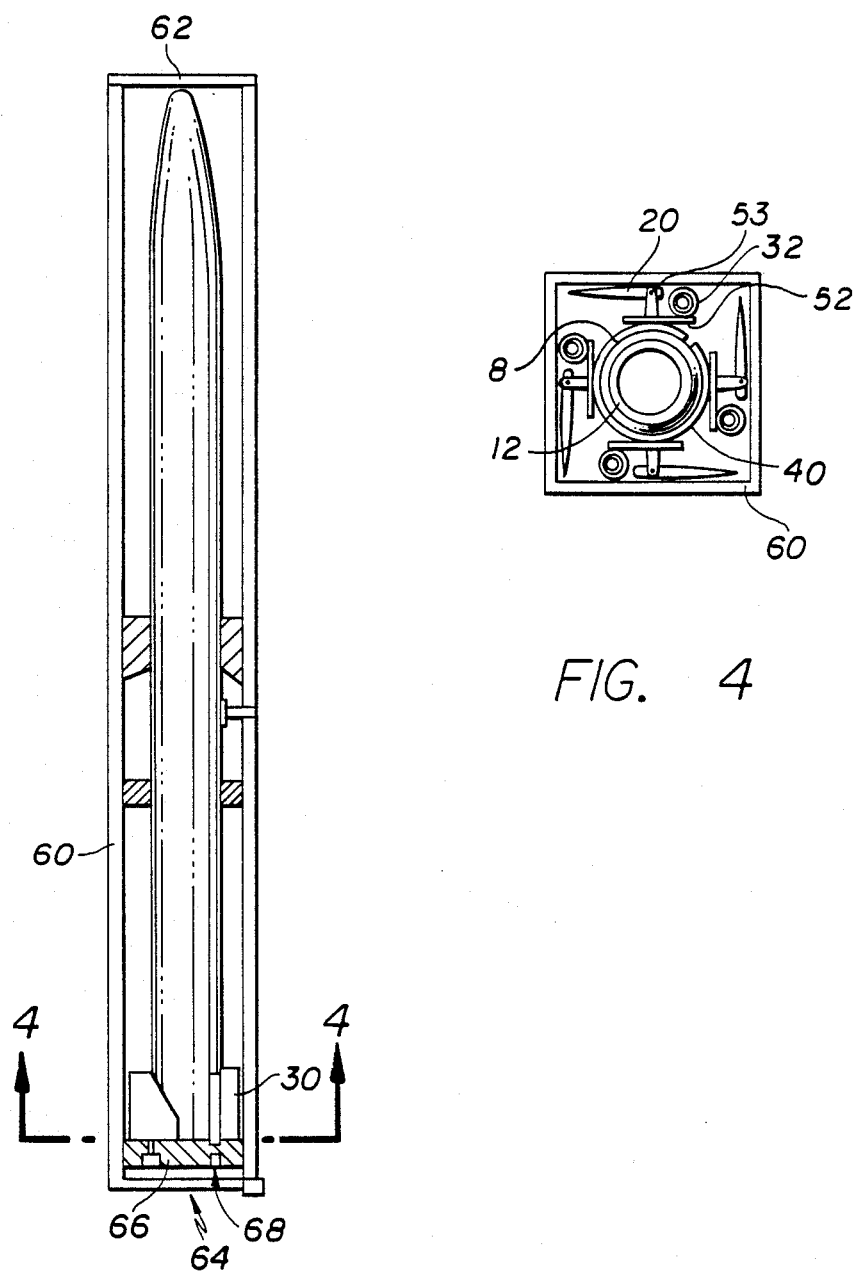

DETACHABLE THRUST VECTOR MECHANISM FOR AN AERONAUTICAL VEHICLE

This application is a continuation-in-part of application Ser. No. 801,445, filed Nov. 25, 1985, now abandoned.

BACKGROUND OF THE INVENTION

1. Field of the Invention

The present invention relates to missile systems. More particularly, the present invention relates to propulsion and control systems for missiles.

While the present invention is described herein with reference to an illustrative embodiment for a particular application, it is understood that the invention is not limited thereto. Those of ordinary skill in the art and access to the teachings provided herein will recognize additional modifications, applications and embodiments within the scope thereof.

2. Description of the Related Art

Most winged missiles are controlled by aerodynamic surfaces or fins driven by hydraulic, gas pressure, motor bleed, electric, or other sources of power. As is widely known, the low speed during the initial flight of an earth-launched missile, provides limited aerodynamic force for controlling the missile path.

Thrust vector control (TVC) techniques have therefore been developed to enhance aerodynamic control during the initial launch period. These techniques have generally involved deflection or redirection of the missile exhaust flow to provide control moments. (See e.g., U.S. Pat. No. 4,274,610 issued Jan. 23, 1981 to Bastian). Particular TVC techniques involve the use of control vanes in the exhaust, injection of a volatile fluid within the exhaust, positioning of spoiler blades across the exhaust, and gimballed thrust chambers. These techniques have the universal disadvantages of wasting part of the main rocket thrust for steerage and of requiring major modifications to the missile exhaust structure or the missile body itself.

Although the integrated thrust vector control system of Maudal, (U.S. Pat. No. 4,044,970, issued Aug. 30, 1977) attempted to solve certain of the above problems, the Maudal system has significant shortcomings. The first is that it requires a thrust vector mechanism, or rocket motor, *which is integral* to the missile fin ("tail panel"). Since the thrust from the rocket motors passes through the fins, the fins must be designed to handle thrust loads. This adds to the weight of the missile and reduces its cost/performance ratio. Further, since the motor is permanently attached to the fin, the fin may not be balanced aerodynamically when the fuel supply of the motor is exhausted. In addition, the integral system of Maudal does not appear to allow for an inexpensive retrofit of existing missile systems.

Another shortcoming of a system constructed in accordance with the teaching of Maudal is that the TVC system would be designed to act *in concert* with the main missile propulsion system. This would be a significant disadvantage in that any activation of the main booster might leave a signature which would adversely impact on the survivability of the system. In addition, fuel may be expended in an undesired direction thereby limiting the range and effectiveness of the system.

An alternative to the use of TVC would be to bring the missile to a very high velocity quickly so that flight aerodynamics are adequate to provide the required steerage, as in air launch applications. A negative consequence of this technique in a ground launch mode is that the missile would rapidly achieve high elevation, and thereby experience reduced ability to hit close in targets. In addition, more boost energy may be used thereby possibly increasing the signature of the missile.

The above problems may be compounded with respect to a missile designed for both air-to-air and ground launched missions.

SUMMARY OF THE INVENTION

In accordance with the present invention, a relatively inexpensive, high efficiency, detachable thrust vector mechanism is provided for addressing the current shortcomings in the art. In the illustrative embodiment, the invention is used in conjunction with aeronautical vehicle having main propulsion means and at least one fin, movable in response to a conventional control system to provide early flight stage maneuverability.

The invention is a a detachable thrust vector mechanism comprising auxiliary propulsion means pivotally attached to the missile through connecting means. Contact means are provided for transferring bidirectional motion of the fin to the auxiliary propulsion means. The mechanism is operable to provide auxiliary thrust for the missile along a thrust vector determined by the conventional control system of the missile. The invention effectuates missile steerage at low speeds, particularly during initial launch and pitchover. The mechanism of the present invention falls away during flight to fully exploit the original optimized aerodynamic or hydrodynamic design of the missile.

The thrust vector mechanism of the present invention conserves the main motor fuel, reduces the initial missile launch signature and effectively increases range. The invention also provides a low cost, disposable mechanism for converting a missile designed for high speed (air-to-air) launches to one adapted for low speed (surface) launches. That is, under the teachings of the present invention, existing missiles may be inexpensively retrofit to provide thrust vector control.

BRIEF DESCRIPTION OF THE DRAWINGS

FIG. 3 is a longitudinal cross-sectional view of the embodiment of FIG. 1 housed in a typical missile launch tube.

FIG. 4 is an end view of the launch tube showing how the V-clips of the present invention engage the missile fins when the fins are in the folded position.

DESCRIPTION OF THE INVENTION

Figure 1:
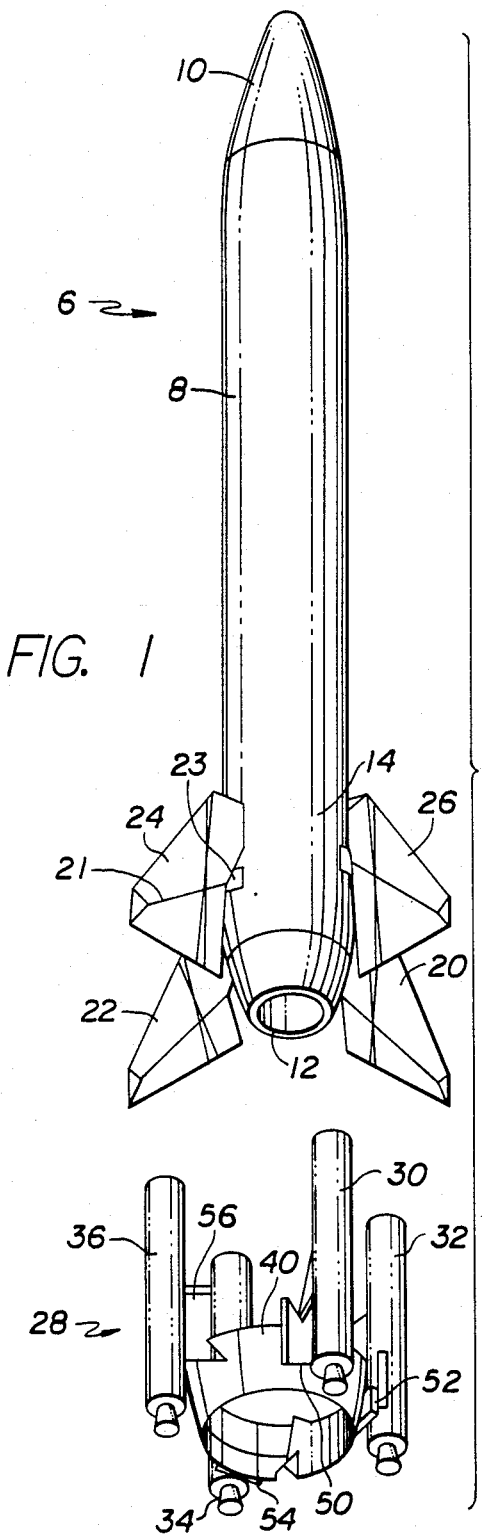
FIG. 1 is a perspective exploded view of the illustrative embodiment of the invention which includes auxiliary motors mounted on a circular ring for positioning about the aft end of a missile.

A typical missile 6 is shown in FIG. 1 as having a cylindrical body 8 with a warhead end 10 and an aft propulsion end 12. The missile 6 has a main or primary motor 14 at the propulsion end 12. The missile also has several control surfaces or fins 20, 22, 24, and 26. The fins are actuated by typical servo-mechanisms in response to a conventional control system (not shown).

The detachable thrust vector mechanism 28 of the present invention is shown in FIG. 1 in disassembled relation relative to the missile 6. The invention 28 consists of four auxiliary (micro) motors 30, 32, 34, and 36 which are pivotally mounted on a "C" ring 40. The C ring 40 may be constructed of any suitable material. The ring 40 is shaped for slideable engagement with the propulsion end 12 of the missile 6. The C ring "key abuts" the aft end 12 of the missile 6 in conformal nonmechanical attachment. Ideally, the ring 40 is "keyed" so that it will not rotate when it is in place on the missile.

The auxiliary motors may be of conventional design and the invention is not limited to the propellant used. It will be evident to one of ordinary skill in the art that the motor pivots should be designed for sufficient strength to handle launch loads.

Each of the small motors 30, 32, 34, and 36 has a small V-clip 50, 52, 54, and 56 respectively which is designed for engagement with a corresponding fin. The V-clips provide contact means between the fins and the motors.

Figure 2:
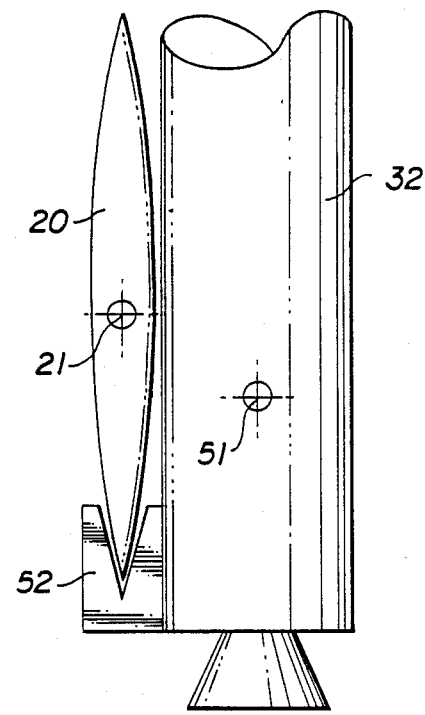
FIG. 2 is a side elevational view showing the connection between a missile fin and an auxiliary motor in accordance with the teachings of the present invention.

The elevational side view of FIG. 2, shows how the V-clip of each motor engages the corresponding fin when the mechanism 28 is in position on the missile 6. Thus, when the fin 20 is actuated by the missile control system to rotate about a pivot 21, the V-clip 52 transfers the pivotal bi-directional motion of the fin 20 to the auxiliary motor 32. That is, the pivotal attachment of the motor 32 to the ring 40 (at the pivot point 51) is such as to allow the motor 32 to rotate or swivel in response to the bi-directional motion of the fin 20. The effect is to allow the thrust of the motors to be directed by the missile control system through the fins. The propulsive forces produced by the motors are transferred through the pivots 51 to the ring 40 and into the missile 6.

Prior to launch, the missile 6 may be carried in a launch tube transporter 60 for land launch or sea launch. As shown in FIG. 3, the launch tube has a closed breech end 64 and a muzzle end 62. The view of the launch tube 60 through an open breech end 64, provided in FIG. 4, reveals that the fins are folded at a hinge 53 and how the clips 52 engage the fins when the fins are in the folded position.

As housed in the launch tube, a sabot 66 maintains the contact between the fins and the clips without further mechanical attachment, and this contact is maintained during initial launch by the upward thrust of the auxiliary motors. The breech end 64 of the tube 60 is normally closed, and contains safe, arm, and ignition systems (not shown) for the auxiliary motors.

Upon ignition, the auxiliary motors fire through the sabot 66 into a common chamber 68 in the breech end 64 of the tube. The exhaust pressurizes the breech end and thereby accelerates the missile out from the muzzle end 62 of the launch tube. (In the preferred embodiment, the sabot 66 is designed to be trapped by the tube's muzzle end 62 as the missile exits the tube 60.) The fins unfold after the missile has cleared the launch tube. The subsequent actuation of the fins by the control system is effective, as discussed above, to direct the thrust of the auxiliary motors and thereby provide missile steerage.

The thrust vector mechanism 28 is held in place by the upward thrust of the auxiliary motors. Thus, when the main motor is subsequently ignited, the missile accelerates away from the substantially spent mechanism 28.

While the present invention has been described herein with reference to an illustrative embodiment for a particular application, the invention is not limited thereto. Those having ordinary skill in the art and access to the teachings of the present invention will recognize additional modifications, applications and embodiments within the scope thereof. For example, although the C ring in the preferred embodiment is designed to be connected to, and to automatically separate from, the missile's aft end without mechanical action, it can be seen that various mounting means may be employed within the scope of the present invention. In addition, the invention is not limited to the number or type of auxiliary motors used. Further, the invention is not limited to the physical nexus illustrated between the fins or other control surfaces and the motors. Where V-clips are used, they may be pivotally attached to the motors to provide a variable linkage ratio between the fins and the motors. Finally, the invention is not limited to use with aeronautical vehicles. The teachings of the invention may be applied to nautical as well as aeronautical vehicles.

It is intended by the appended claims to cover any and all such modifications, applications and embodiments.

Accordingly,

What is claimed is:

1. A detachable thrust vector mechanism for a missile having a primary propulsion means and at least one control fin movable in response to a control system, said detachable thrust vector mechanism comprising:

a ring member shaped and adapted for slidable engagement with the aft end of said missile;

auxiliary propulsion means pivotally attached to said ring member; and contact means affixed to said auxiliary propulsion means and configured for contacting said at least one control fin whereby bidirectional motion of said fin produces corresponding bidirectional motion of said auxiliary propulsion means;

whereby said mechanism is operable to provide launch thrust and auxiliary thrust for the missile along a thrust vector determined by said control system and said mechanism will slidably disengage from said missile upon firing of said primary propulsion means.

2. The detachable thrust vector mechanism of claim 1 wherein:

said auxiliary propulsion means is a rocket motor; and said contact means includes a V-clip adapted to receive, in its open end, the aft end of said at least one control fin.

* * * * *